United States Patent
Lin

(10) Patent No.: US 10,293,784 B2
(45) Date of Patent: May 21, 2019

(54) ON-BOARD UNIT AND METHOD FOR OPERATING THE SAME, CORRESPONDING TRANSPORTATION AND METHOD FOR OPERATING TRANSPORTATION ANTI-THIEF SYSTEM

(71) Applicant: Acer Incorporated, New Taipei (TW)

(72) Inventor: Jia-Sheng Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/912,685

(22) Filed: Mar. 6, 2018

(65) Prior Publication Data
US 2018/0354457 A1 Dec. 13, 2018

(30) Foreign Application Priority Data
Jun. 8, 2017 (TW) .............................. 106119088 A

(51) Int. Cl.
*G05B 19/00* (2006.01)
*B60R 25/24* (2013.01)
*B60R 25/20* (2013.01)

(52) U.S. Cl.
CPC ............ *B60R 25/24* (2013.01); *B60R 25/209* (2013.01)

(58) Field of Classification Search
CPC ............ H04Q 1/00; H04Q 9/00; H01H 47/00; H02G 3/00; G05B 19/00
USPC .......... 340/5.61, 5.24, 5.72, 5, 26, 5.28, 426
See application file for complete search history.

(56) References Cited

U.S. PATENT DOCUMENTS

| | | | | |
|---|---|---|---|---|
| 6,404,071 B1* | 6/2002 | Kurano | ................... | B60R 25/04 114/55.58 |
| 6,525,643 B1* | 2/2003 | Okada | ..................... | B60R 25/24 340/426.1 |
| 6,919,791 B2* | 7/2005 | Toyomasu | .............. | B60R 25/04 307/10.5 |
| 7,154,376 B2* | 12/2006 | Yoshida | .............. | H02J 13/0075 340/5.63 |
| 7,554,217 B2* | 6/2009 | Unno | ................ | B60R 25/02153 307/9.1 |

(Continued)

FOREIGN PATENT DOCUMENTS

| | | |
|---|---|---|
| CN | 105966354 A | 9/2016 |
| TW | M535667 U | 1/2017 |

*Primary Examiner* — Nam V Nguyen
(74) *Attorney, Agent, or Firm* — Birch, Stewart, Kolasch & Birch, LLP

(57) ABSTRACT

An on-board unit (OBU) coupled to an integrated starter generator (ISG) is disclosed. The ISG controls an engine. The OBU includes a communication unit and a processing unit. The communication unit receives a control signal from a mobile device. The processing unit is coupled to the communication unit for setting a setting state of the ISG according to the control signal, wherein the setting state is a start unallowable state or a start allowable state, and the ISG forbids the engine to be started or allows the engine to be started according to whether the setting state is the start unallowable state or the start allowable state. The control signal generates the setting state according to a start counter value, wherein the setting state is set to the start allowable state or the start unallowable state according to whether the start counter value is larger than a predetermined value.

20 Claims, 2 Drawing Sheets

(56) References Cited

U.S. PATENT DOCUMENTS

| | | | | |
|---|---|---|---|---|
| 8,179,285 B2* | 5/2012 | Bamba | ................ | B63H 21/213 |
| | | | | 340/425.5 |
| 9,449,449 B2* | 9/2016 | Evans | ................... | H04L 63/102 |
| 9,701,265 B2* | 7/2017 | Breed | ................... | B60R 16/037 |
| 9,940,763 B2* | 4/2018 | Nagata | ............... | G07C 9/00007 |
| 2006/0170533 A1* | 8/2006 | Chioiu | ............... | G07C 9/00103 |
| | | | | 340/5.61 |
| 2007/0030119 A1* | 2/2007 | Ono | ....................... | B60R 25/24 |
| | | | | 340/5.61 |
| 2016/0132053 A1* | 5/2016 | Schwarz | ............... | G06Q 30/06 |
| | | | | 701/2 |
| 2017/0352215 A1* | 12/2017 | Maiwand | ........... | G07C 9/00896 |

* cited by examiner

ON-BOARD UNIT AND METHOD FOR OPERATING THE SAME, CORRESPONDING TRANSPORTATION AND METHOD FOR OPERATING TRANSPORTATION ANTI-THIEF SYSTEM

This application claims the benefit of Taiwan application Serial No. 106119088, filed Jun. 8, 2017, the subject matter of which is incorporated herein by reference.

BACKGROUND OF THE INVENTION

Field of the Invention

The invention relates in general to an on-board unit (OBU) and method for operating the same, a corresponding transportation and a method for operating a transportation anti-thief system.

Description of the Related Art

Transportation vehicles such as cars and motorcycles have become popular conveyances for modern people pursuing traffic convenience. Motorcycles are cheaper, smaller, more petro saving and more parking friendly than cars, and therefore have gained great popularity in many countries. To save time and energy, many people would use motorcycles as their transportation vehicles when they go to their work, go for a picnic or go to a convenient shop.

Motorcycles have simpler structure than cars. Due to cost consideration, motorcycles are less likely to be equipped with a complicated anti-thief system, and therefore are apt to become targets of burglars. Statistics shows that "anti-theft" is ranked as the third in the function list for male consumers but is ranked as number one in the function list for female consumers. "Anti-theft" function is highly regarded by consumers. Therefore, how to improve the anti-theft function of transportation vehicles has become a prominent task for the industries.

SUMMARY OF THE INVENTION

According to one embodiment of the invention, an on-board unit (OBU) is disclosed. The OBU is coupled to an integrated starter generator (ISG). The ISG controls an engine. The OBU includes a communication unit and a processing unit. The communication unit receives a control signal from a mobile device. The processing unit is coupled to the communication unit. The processing unit sets a setting state of the ISG according to the control signal, wherein the setting state is a start unallowable state or a start allowable state; when the setting state is the start unallowable state, the ISG forbids the engine to be started; when the setting state is the start allowable state, the ISG allows the engine to be started with a physical key. The control signal generates the setting state according to a start counter value, wherein when the start counter value is larger than a predetermined value, the setting state is set to the start allowable state; when the engine is started, the start counter value is decreased by a difference value; when the start counter value is not larger than the predetermined value, the setting state is set to the start unallowable state.

According to another embodiment of the invention, a method for operating on-board unit (OBU) is disclosed. The method includes following steps. A control signal is received from a mobile device. A setting state of an integrated starter generator (ISG) is set according to the control signal, wherein the setting state is a start unallowable state or a start allowable state, and the ISG controls an engine; when the setting state is the start unallowable state, the ISG forbids the engine to be started; when the setting state is the start allowable state, the ISG allows the engine to be started with a physical key. The control signal generates the setting state according to a start counter value, wherein when the start counter value is larger than a predetermined value, the setting state is set to the start allowable state; when the engine is started, the start counter value is decreased by a difference value; when the start counter value is not larger than the predetermined value, the setting state is set to the start unallowable state.

According to an alternate embodiment of the invention, a transportation is disclosed. The transportation includes an engine, an integrated starter generator (ISG) and an OBU. The ISG is coupled to the engine. The OBU is coupled to the ISG. The OBU receives a control signal from a mobile device. The OBU is configured to set a setting state of the ISG according to the control signal, wherein the setting state is a start unallowable state or a start allowable state; when the setting state is the start unallowable state, the ISG forbids the engine to be started; when the setting state is the start allowable state, the ISG allows the engine to be started with a physical key. The control signal generates the setting state according to a start counter value, wherein when the start counter value is larger than a predetermined value, the setting state is set to the start allowable state; when the engine is started, the start counter value is decreased by a difference value; when the start counter value is not larger than the predetermined value, the setting state is set to the start unallowable state.

According to another alternate embodiment of the invention, a method for operating a transportation anti-thief system is disclosed. The method includes following steps. A control signal is received from a mobile device by an OBU. A setting state of an integrated starter generator (ISG) is set by the OBU according to the control signal, wherein the setting state is a start unallowable state or a start allowable state, and the ISG controls an engine; when the setting state is the start unallowable state, the ISG forbids the engine to be started; when the setting state is the start allowable state, the ISG allows the engine to be started with a physical key. The control signal generates the setting state according to a start counter value, wherein when the start counter value is larger than a predetermined value, the setting state is set to the start allowable state; when the engine is started, the start counter value is decreased by a difference value; when the start counter value is not larger than the predetermined value, the setting state is set to the start unallowable state.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
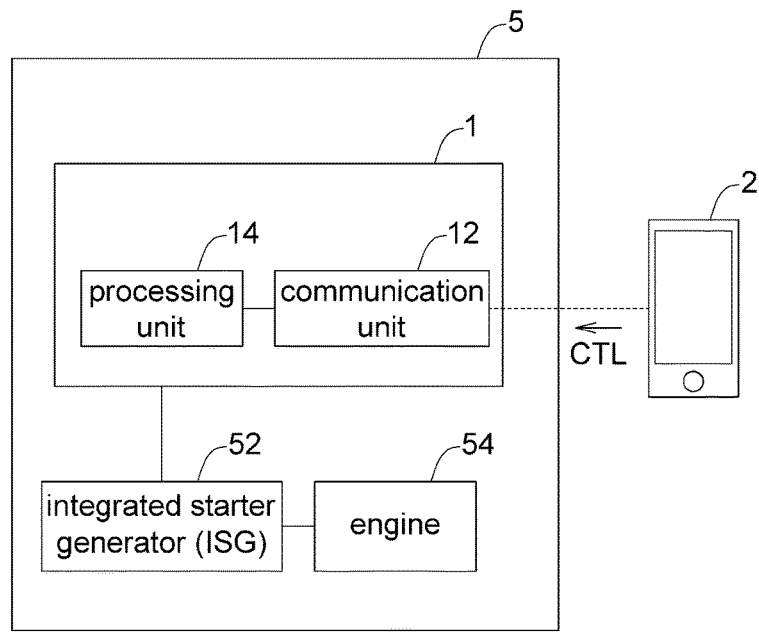
FIG. 1 is a system block diagram of a transportation anti-thief system according to a first embodiment of the present invention.

Referring to FIG. 1, a system block diagram of a transportation anti-thief system according to a first embodiment of the present invention is shown. In the first embodiment, the transportation anti-thief system includes a transportation 5 and a mobile device 2. The transportation 5 includes an engine 54, an integrated starter generator (ISG) 52 and an on-board unit (OBU) 1. The ISG 52 is coupled to the engine 54 for controlling the engine 54, for example, to be started. The OBU 1 is coupled to the ISG 52.

The OBU 1 includes a communication unit 12 and a processing unit 14. The communication unit 12 is connected to the mobile device 2 through communication. The processing unit 14 is coupled to the communication unit 12 for setting a setting state of the ISG 52, wherein the setting state is a start unallowable state or a start allowable state; when the setting state of the ISG 52 is the start unallowable state, the ISG 52 forbids the engine 54 to be started, that is, the transportation 5 currently cannot be started; when the setting state of the ISG 52 is the start allowable state, the ISG 52 allows the engine 54 to be started with a physical key.

Figure 2:
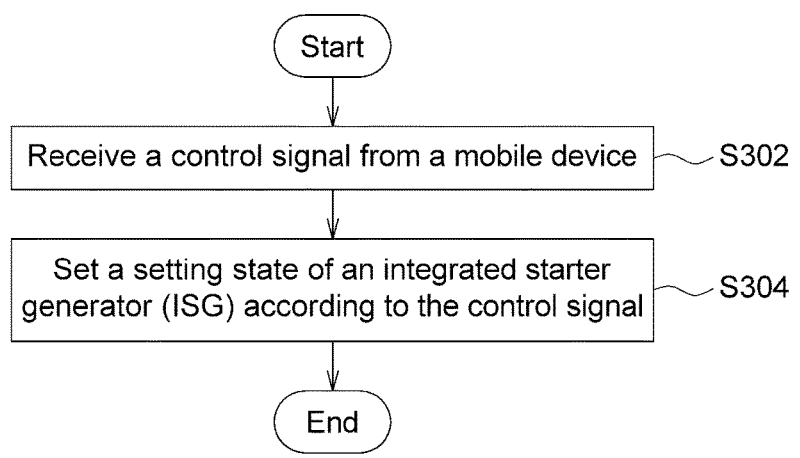
FIG. 2 is a flowchart of a method for operating OBU according to a first embodiment of the present invention.

In the first embodiment of the present invention, the method for operating the OBU 1 is disclosed below with accompany drawing FIG. 2, a flowchart of a method for operating OBU according to a first embodiment of the present invention.

In step S302, when the communication unit 12 and the mobile device 2 are connected through communication, the communication unit 12 will receive a control signal CTL from the mobile device 2. The control signal CTL is a signal instructing the processing unit 14 to set the setting state to a start allowable state or a start unallowable state. The mobile device 2 generates the control signal CTL according to a start counter value stored in the mobile device 2, wherein when the start counter value is larger than a predetermined value (such as 0), the mobile device 2 generates the control signal CTL instructing the processing unit 14 to set the setting state to the start allowable state; when the start counter value is not larger than the predetermined value (such as is equivalent to 0), the mobile device 2 generates the control signal CTL instructing the processing unit 14 to set the setting state to the start unallowable state.

In step S304, the processing unit 14 sets the setting state of the ISG 52 according to the control signal CTL, wherein when the setting state is the start unallowable state, the ISG 52 forbids the engine 54 to be started; when the setting state is the start allowable state, the ISG 52 allows the engine 54 to be started with a physical key; after the engine 54 was started and the processing unit 14 sent a message through the communication unit 12 to inform the mobile device 2 that the engine 54 has been successfully started, the mobile device 2 decreases the start counter value by a difference value (such as 1).

The start counter value relates to the number of times for which the engine 54 can be started. In an exemplary embodiment, the predetermined value is assumed to 0, the difference value is assumed to 1, and the start counter value is an integer larger than or equivalent to 0. Here, the current start counter value represents the number of times for which the current engine 54 can be started. As long as the start counter value is larger than 0, the control signal CTL transmitted by the mobile device 2 will instruct the processing unit 12 to set the setting state of the ISG 52 to the start allowable state, so that the user can start the transportation 5 with a physical key. Each time when the transportation 5 is started, the start counter value will be decreased by 1 (that is, the difference value), that is, each time when the transportation 5 is started, the number of times for which the transportation 5 can be started will be decreased by 1. Once the start counter value is equivalent to 0 (that is, the start counter value is not larger than the predetermined value), the control signal CTL transmitted by the mobile device 2 will instruct the processing unit 14 to set the setting state of the ISG 52 to the start unallowable state and forbid the transportation 5 to be started. Meanwhile, the user can no longer start the transportation 5 with the physical key.

Preferably, the upper limit of the start counter value is a maximum value such as 5. After the mobile device 2 passed the ID verification procedure of the management server, and the mobile device 2 and the management server were connected again, the start counter value can be re-set to the maximum value. In the exemplary embodiment disclosed above, before or when the start counter value is decreased to 0, the user can perform a top-up procedure on the mobile device 2 connected to the management server through communication to assure that the transportation 5 is in the start allowable state. After the top-up procedure was performed, the start counter value can be re-set to the maximum value. For example, if the maximum value is 5, this implies that each time the user performs the top-up procedure, the transportation 5 can be started for 5 times before the top-up procedure is again performed by the user.

In the present embodiment, the communication unit 12 and the mobile device 2 can be connected through communication, for example, through Bluetooth connection. Let the Bluetooth connection be taken for example. When the mobile device 2 is connected to the OBU 1 through communication for the first time (pairing), the connection can be performed by way of broadcasting. After the pairing was completed, signal transmission can be performed by way of device to device connection.

Besides, the transportation 5 further includes a physical key hole (not illustrated). After the physical key was inserted into the physical key hole, the user can rotate the physical key to electrify or start the transportation 5. Here, "to electrify" refers to providing power to other devices (such as the ISG 52 and the OBU 1) by a power supply device of the transportation 5 (such as a battery). Here "to start" refers to starting the engine 54 by the ISG 52 in response to the physical key being rotated to the start allowable position of the transportation 5 when the current setting state of the ISG 52 (that is, the current setting state of the transportation 5) is the start allowable state. However, if the current setting state of the ISG 52 (that is, the current setting state of the transportation 5) is the start unallowable state, the ISG 52 cannot start the engine 54 even though the physical key is rotated to the start allowable position of the transportation 5. With the design of setting the setting states of the ISG 52 and the transportation 5 by the mobile device 2, the transportation 5 gains extra security protection and the risk of theft is reduced.

Moreover, the mobile device 2 can perform an application program installed in the mobile device 2 to transmit the control signal CTL and can perform a user interface application program to display the current start counter value on the monitor. The application program can further provide at least one option enabling the mobile device 2 to be connected to the management server through communication, so that the user can perform a top-up procedure. To enhance security protection, the mobile device 2, through the application program, can selectively work with suitable hardware elements to perform a user identification program on the user to identify the user' identity. The user identification program includes at least one of fingerprint identification, retinal identification, voiceprint identification, digital/graphical password identification. Only after the user has successfully passed the user identification program will the mobile device 2 be allowed to transmit the control signal CTL.

In the first embodiment, when the ISG 52 is in the start unallowable state, even though the user inserts the physical key into the key hole and performs corresponding start operation, the ISG 52 will not respond to the operation of the physical key to start the engine 54. Conversely, when the ISG 52 is in the start allowable state, the user can start the engine with the physical key. In other words, in order to successfully start the transportation 5, the user needs to connect the mobile device 2 to the OBU 1 through communication, and the start counter value must be larger than the predetermined value. Thus, the mechanism of the OBU 1 and the start counter value provides extra anti-theft protection to the transportation 5 and makes it become more difficult for the burglar to steal the transportation 5. Also, a user identification program can be installed in the mobile device 2. The user needs to pass the identification of the user identification program otherwise the mobile device 2 will not transmit the control signal CTL. Thus, the security of the transportation 5 can be further enhanced. Even when the burglar has successfully stolen the physical key and the mobile device 2, the burglar still cannot start the transportation 5 if the burglar cannot pass the user identification program. Thus, the anti-theft function really works on the transportation 5.

Figure 3:
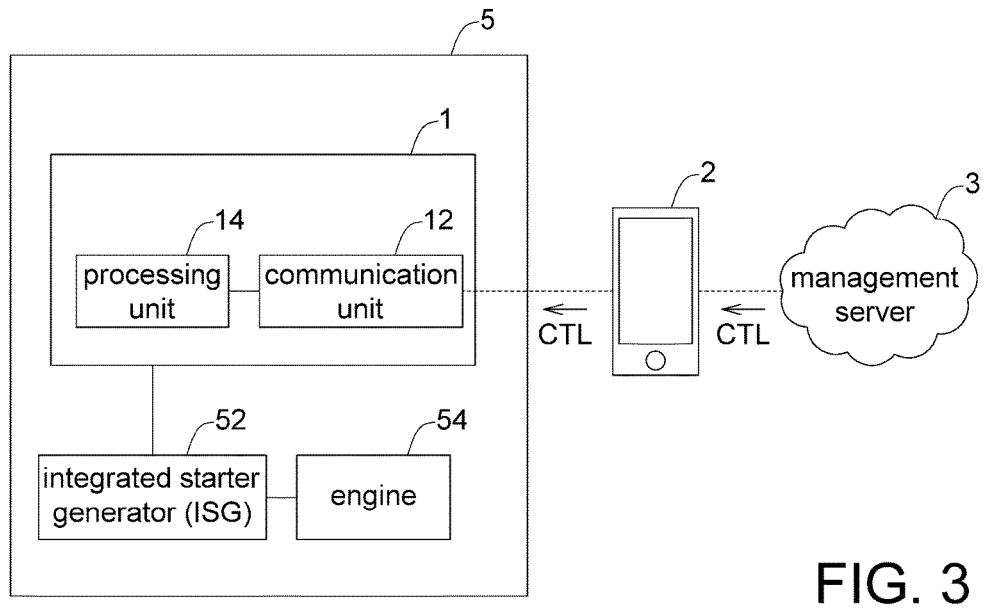
FIG. 3 is a system block diagram of a transportation anti-thief system according to a second embodiment of the present invention.
Figure 4:
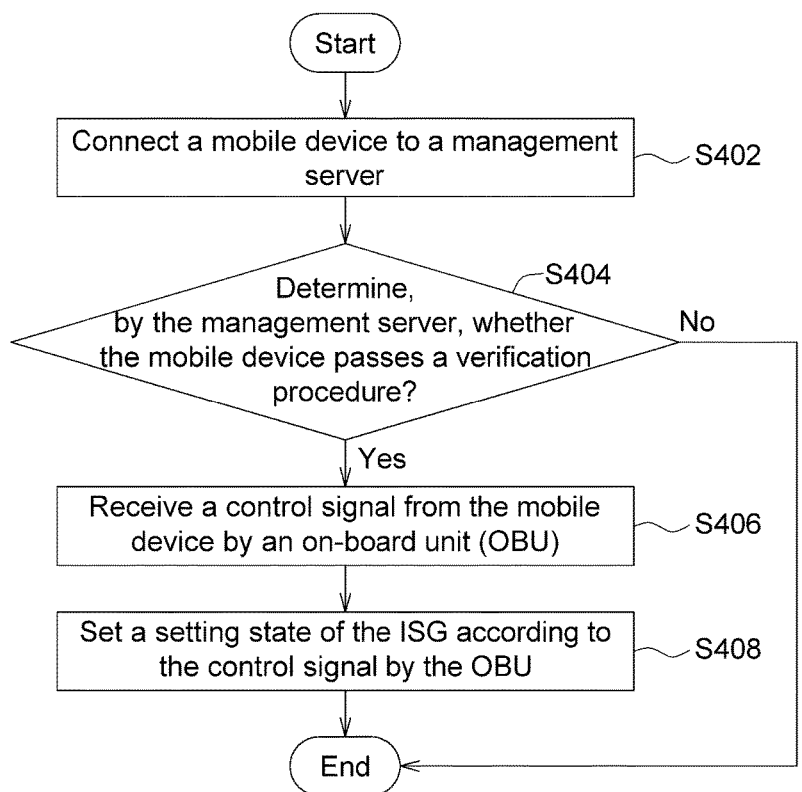
FIG. 4 is a flowchart of a method for operating a transportation anti-thief system according to a second embodiment of the present invention.

Referring to FIG. 3, a system block diagram of a transportation anti-thief system according to a second embodiment of the present invention is shown. The second embodiment is different from the first embodiment in that the transportation anti-thief system of the second embodiment further includes a management server 3, which is connected to the mobile device 2 through communication. The second embodiment is disclosed below with accompanying drawings FIG. 3 and FIG. 4. FIG. 4 shows a flowchart of a method for operating a transportation anti-thief system according to a second embodiment of the present invention.

In step S402, the mobile device 2 is connected to the management server 3 through communication. If the mobile device 2 is connected to the management server 3 through communication for the first time, the mobile device 2 can perform an account registration procedure on the management server 3.

During the account registration procedure, the management server 3 can store relevant information of the transportation 5, such as an engine number of the engine 54 and/or an OBU number of the OBU 1a, in an account corresponding to the mobile device 2. The engine number and the OBU number are unique numbers granted during the manufacturing process of the engine and the OBU, and therefore can be regarded as an identification codes of the engine and the OBU. When the mobile device 2 is connected to the management server 3 through communication for the first time, the user can perform an application program of the mobile device 2 to register an account with the management server 3. During the account registration procedure, the user needs to provide the engine number of the engine 54 and/or the OBU number of the OBU 1a such that the management server 3 can link the account to relevant information of the transportation 5. Moreover, during the account registration procedure, the management server 3 can request the user to provide relevant information of the mobile device 2, such as a mobile phone number and/or an international mobile equipment identity (IMEI) number of the mobile phone, or an identification code of the user (such as an ID number or a driver license number). Besides, the management server 3 can also request the user to set a password, such as a four-digit password, with which the user can log in the account registered with the management server 3.

In step S404, the management server 3 determines whether the mobile device 2 passes a verification procedure. If the management server 3 determines that the mobile device 2 passes the verification procedure, step S406 is performed. Conversely, if the management server 3 determines that the mobile device 2 does not pass the verification procedure, the method is terminated. The user can operate an application program of the mobile device 2 to request the management server 3 to perform a verification procedure. For example, the user can log in an account registered with the management server 3, and the verification procedure is regarded as successful if the user can successfully log in the account. Or, after the user logged in the account registered with the management server 3 and inputted relevant information, the verification procedure will be regarded as successful if the relevant information matches with the information recorded in the management server 3. The relevant information includes at least one of an engine number of the engine 54, an OBU number of the OBU 1a, a mobile phone number of the mobile device 2, an IMEI number of the mobile phone, and an identification code of the user.

Or, during the account registration procedure, the user can store registration data in an application program of the mobile device 2. When requesting the management server 3 to perform a verification procedure, the user can select a corresponding function option of the application program. For example, the user can press the "verification" icon to transmit the information required in the verification procedure. Then, the management server 3 determines whether the mobile device 2 passes the verification procedure according to the information provided by the mobile device 2. For example, the management server 3 determines whether the mobile device 2 passes the verification procedure according to whether at least one of the engine number, the OBU number, the mobile phone number of the mobile device 2, the IMEI number of the mobile phone, and an identification code of the user provided by the mobile device 2 during the verification procedure matches with the information stored in the management server 3. Only after the mobile device 2 has successfully passed the verification procedure will the management server 3 generate the control signal CTL according to the start counter value stored in the management server 3, and transmit the control signal CTL to the mobile device 2.

In step S406, the OBU 1 receives a control signal CTL from the mobile device 2. In the second embodiment, the mobile device 2 is used as a communication medium between the management server 3 and the OBU 1, and the control signal CTL is generated by the management server 3 and is transmitted to the OBU 1 through the mobile device 2. That is, the mobile device 2 receives the control signal CTL from the management server 3 and further passes the control signal CTL to the OBU 1.

In step S408, the OBU 1 sets a setting state of the ISG 52 according to the control signal CTL, wherein the setting state is a start unallowable state or a start allowable state;

when the setting state is the start unallowable state, the ISG 52 forbids the engine 54 to be started; when the setting state is the start allowable state, the ISG 52 allows the engine 54 to be started with a physical key.

When the engine 54 is started, the OBU 1 transmits a message through the mobile device 2 to inform the management server 3 that the engine has been successfully started, and the management server 3 will accordingly decrease the start counter value by a difference value (or, the mobile device 2 will decrease the start counter value by a difference value). In other words, in the second embodiment, the management server 3 controls the start counter value to avoid the start counter value being altered. Besides, before the user connects the mobile device 2 to the management server 3 through communication to perform a top-up procedure, the management server 3 can request the user to perform a verification procedure beforehand, and the user cannot perform the top-up procedure to increase or re-set the start counter value unless the user successfully passes the verification procedure.

In comparison to the transportation anti-thief system of the first embodiment, the transportation anti-thief system of the second embodiment further includes a management server 3. Through the verification procedure of the account of the management server, the user's identity is further confirmed, and security protection is further enhanced. The verification procedure makes it more difficult for the burglar to crack the anti-theft mechanism within a short time, hence discouraging the burglar's burglary attempt, reducing the risk of theft and enhancing the anti-theft function of the transportation.

In the present invention, the variety of the transportation is not restricted, and the transportation can be realized by cars or motorcycles. The engine can be realized by a petrol engine, a diesel engine, a power engine, or an oil and electricity hybrid engine. Although the quantity of engines is exemplified by 1 in above disclosure, the quantity of engines can be more than 1 in different embodiments. For example, the engine can be a petrol engine in conjunction with a power engine. The OBU can be built in the transportation or additionally installed in the transportation. The management server can be a cloud server connected through a network.

According to the on-board unit (OBU) and method for operating the same, the corresponding transportation and the method for operating a transportation anti-thief system disclosed in the present invention, the user controls a mobile device to transmit a control signal to the OBU for locking/unlocking the ISG to forbid or allow the engine to be started with a physical key, such that extra protection can be added to the transportation. Furthermore, before the control signal is transmitted to the OBU, the user needs to pass a verification procedure performed by the management server and/or a user identification program performed by the mobile device. Despite having a master key, the burglar still cannot start the engine unless the burglar can successfully pass the verification procedure and the user identification program. Therefore, the burglar's attempt is discouraged, the risk of theft is reduced, and security protection is enhanced.

In other embodiments, the present invention can also be used in business such as transportation leasing. After the mobile device 2 was connected to the management server through communication, the user can perform a top-up procedure to add an option value to the start counter value. For example, the top-up procedure can provide different option values such as 2, 4, and 6 for the user to choose. Different option values may correspond to different charges. The user can choose an option value according to personal needs such that the leased transportation can have better security and convenience.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An on-board unit (OBU) coupled to an integrated starter generator (ISG), the ISG used for controlling an engine, and the OBU comprises:
    a communication unit used for receiving a control signal from a mobile device; and
    a processing unit coupled to the communication unit for setting a setting state of the ISG according to the control signal, wherein the setting state is a start unallowable state or a start allowable state;
    wherein, when the setting state is the start unallowable state, the ISG forbids the engine to be started;
    wherein, when the setting state is the start allowable state, the ISG allows the engine to be started with a physical key;
    wherein, the control signal generates the setting state according to a start counter value; when the start counter value is larger than a predetermined value, the setting state is set to the start allowable state; when the engine is started, the start counter value is decreased by a difference value by a management server which is connected in communication with the mobile device; when the start counter value is not larger than the predetermined value, the setting state is set to the start unallowable state.

2. The OBU according to claim 1, wherein, when the mobile device and the management server are connected through communication, the start counter value will be re-set to a maximum value, and the maximum value is larger than the predetermined value.

3. The OBU according to claim 1, wherein after the mobile device passed a verification procedure of the management server, the control signal is generated by the management server and transmitted to the communication unit through the mobile device.

4. The OBU according to claim 3, wherein verification procedure is performed by using at least one of an OBU number of the OBU and an engine number of the engine corresponding to the OBU, and at least one of a mobile phone number of the mobile device and an identification code.

5. The OBU according to claim 1, wherein the control signal is generated by the mobile device having performed a user identification program on itself.

6. A method for operating on-board unit (OBU), comprising:
    receiving a control signal from a mobile device; and
    setting a setting state of an integrated starter generator (ISG) according to the control signal, wherein the setting state is a start unallowable state or a start allowable state, and the ISG controls an engine;
    wherein, when the setting state is the start unallowable state, the ISG forbids the engine to be started;
    wherein, when the setting state is the start allowable state, the ISG allows the engine to be started with a physical key;

wherein, the control signal generates the setting state according to a start counter value; when the start counter value is larger than a predetermined value, the setting state is set to the start allowable state; when the engine is started, the start counter value is decreased by a difference value by a management server which is connected in communication with the mobile device; when the start counter value is not larger than the predetermined value, the setting state is set to the start unallowable state.

7. The method for operating OBU according to claim 6, wherein, when the mobile device and the management server are connected through communication, the start counter value will be re-set to a maximum value, and the maximum value is larger than the predetermined value.

8. The method for operating OBU according to claim 6, wherein, after the mobile device passed a verification procedure of the management server, the control signal is generated by the management server and transmitted to the communication unit through the mobile device.

9. The method for operating OBU according to claim 8, wherein, the verification procedure is performed by using at least one of an OBU number of the OBU and an engine number of the engine corresponding to the OBU, and at least one of a mobile phone number of the mobile device and an identification code.

10. The method for operating OBU according to claim 6, wherein the control signal is generated by the mobile device having performed a user identification program on itself.

11. A transportation, comprising:
an engine;
an integrated starter generator (ISG) coupled to the engine; and
an OBU coupled to the ISG for receiving a control signal from a mobile device and setting a setting state of the ISG according to the control signal, wherein the setting state is a start unallowable state or a start allowable state,
wherein, when the setting state is the start unallowable state, the ISG forbids the engine to be started;
wherein, when the setting state is the start allowable state, the ISG allows the engine to be started with a physical key;
wherein, the control signal generates the setting state according to a start counter value; when the start counter value is larger than a predetermined value, the setting state is set to the start allowable state; when the engine is started, the start counter value is decreased by a difference value by a management server which is connected in communication with the mobile device; when the start counter value is not larger than the predetermined value, the setting state is set to the start unallowable state.

12. The transportation according to claim 11, wherein, when the mobile device and the management server are connected through communication, the start counter value will be re-set to a maximum value, and the maximum value is larger than the predetermined value.

13. The transportation according to claim 11, wherein after the mobile device passed a verification procedure of the management server, the control signal is generated by the management server and transmitted to the OBU through the mobile device.

14. The transportation according to claim 13, wherein the verification procedure is performed by using at least one of an OBU number of the OBU and an engine number of the engine corresponding to the OBU, and at least one of a mobile phone number of the mobile device and an identification code.

15. The transportation according to claim 11, wherein the control signal is generated by the mobile device having performed a user identification program on itself.

16. A method for operating a transportation anti-thief system, comprising:
receiving a control signal from a mobile device by an OBU; and
setting a setting state of an integrated starter generator (ISG) by the OBU according to the control signal, wherein the setting state is a start unallowable state or a start allowable state, the ISG controls an engine;
wherein, when the setting state is the start unallowable state, the ISG forbids the engine to be started;
wherein, when the setting state is the start allowable state, the ISG allows the engine to be started with a physical key;
wherein, the control signal generates the setting state according to a start counter value; when the start counter value is larger than a predetermined value, the setting state is set to the start allowable state; when the engine is started, the start counter value is decreased by a difference value by a management server which is connected in communication with the mobile device; when the start counter value is not larger than the predetermined value, the setting state is set to the start unallowable state.

17. The method for operating a transportation anti-thief system according to claim 16, wherein, when the mobile device and the management server are connected through communication, the start counter value will be re-set to a maximum value, and the maximum value is larger than the predetermined value.

18. The method for operating a transportation anti-thief system according to claim 16, wherein, prior to the step of receiving the control signal from the mobile device by the OBU, the method further comprises:
connecting the management server through communication by the mobile device; and
determining, by the management server, whether the mobile device passes a verification procedure;
wherein, when the management server determines that the mobile device passes the verification procedure, the control signal is generated by the management server generates and is transmitted to the OBU through the mobile device.

19. The method for operating a transportation anti-thief system according to claim 18, wherein, the verification procedure is performed by using at least one of an OBU number of the OBU and an engine number of the engine corresponding to the OBU, and at least one of a mobile phone number of the mobile device and an identification code.

20. The method for operating a transportation anti-thief system according to claim 18, wherein, prior to the step of receiving the control signal from the mobile device by the OBU, the method further comprises:
performing a user identification program on the mobile device by the mobile device itself;
wherein, the mobile device transmits the control signal only after the user identification program has been successfully passed.

* * * * *